Aug. 3, 1943. N. E. WAHLBERG ET AL 2,325,894
AUTOMOTIVE SUSPENSION
Filed Dec. 16, 1940 2 Sheets-Sheet 1
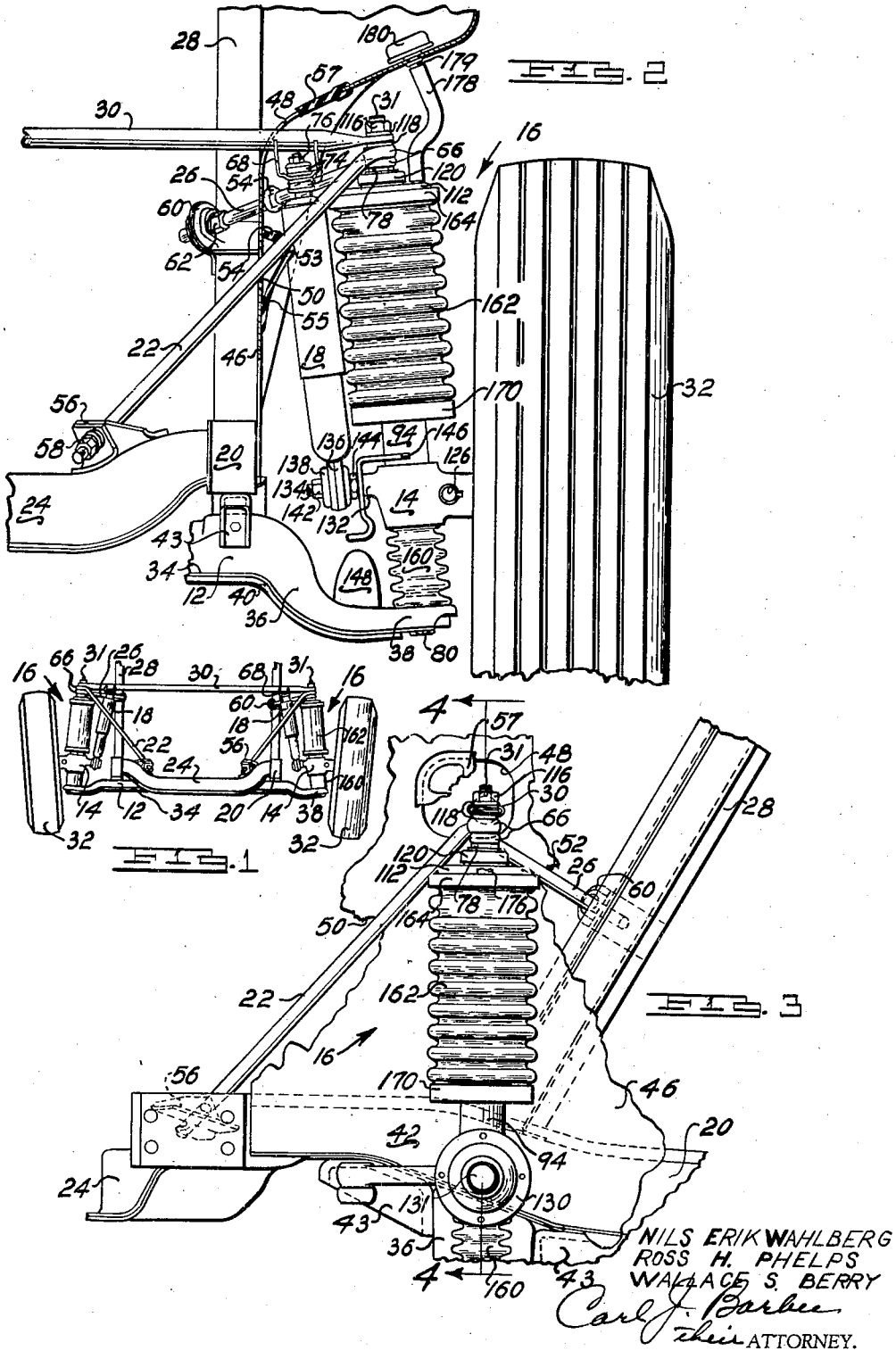

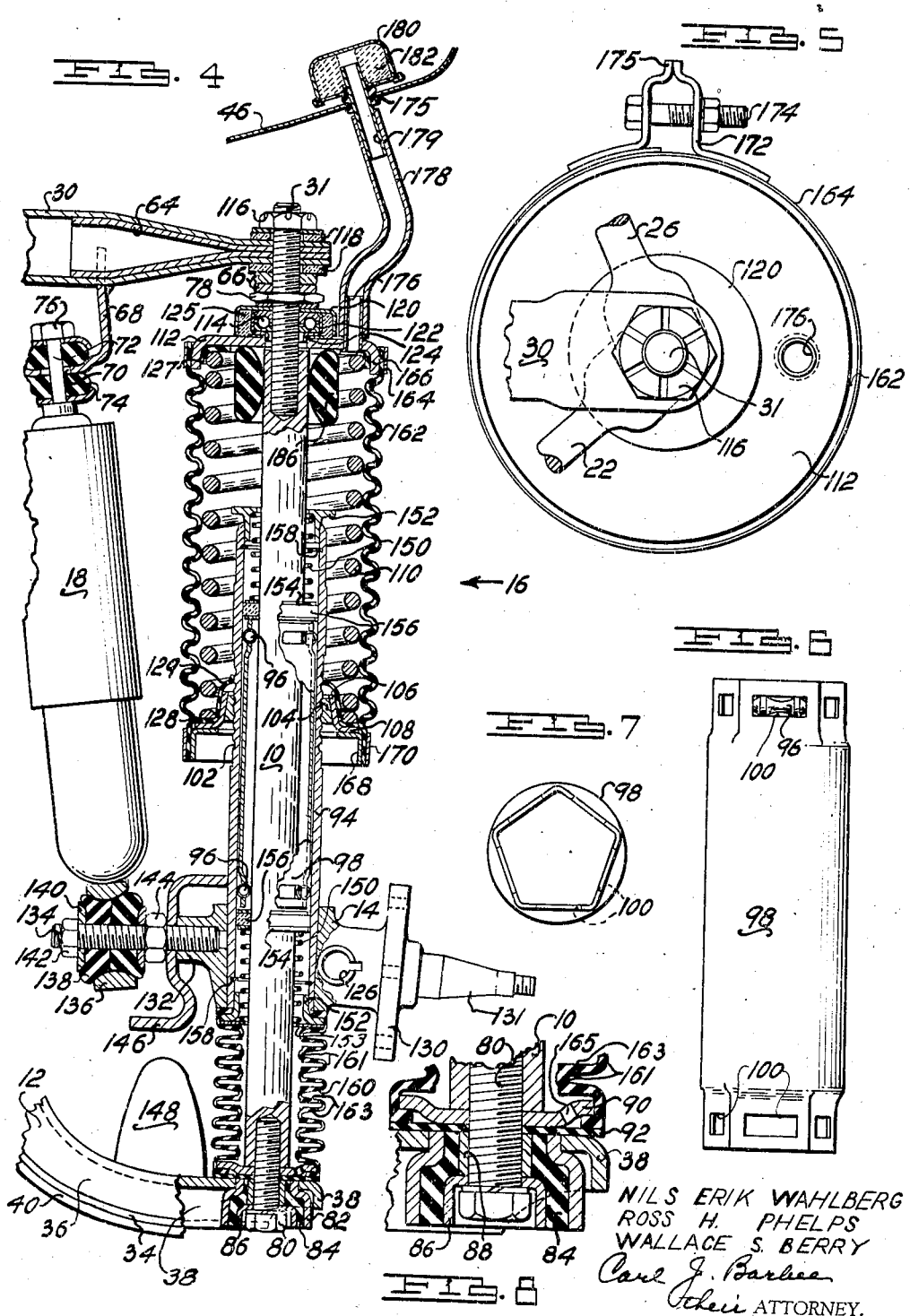

Patented Aug. 3, 1943

2,325,894

UNITED STATES PATENT OFFICE 2,325,894

AUTOMOTIVE SUSPENSION

Nils Erik Wahlberg, Ross H. Phelps, and Wallace S. Berry, Kenosha, Wis., assignors to Nash-Kelvinator Corporation, Kenosha, Wis., a corporation of Maryland Application December 16, 1940, Serial No. 370,286

21 Claims. (Cl. 280—96.2)

This invention relates to automobile wheel suspensions and has particular reference to means for independently springing the front wheels of an automobile.

It is an object of this invention to provide means for bracing a pair of rigid king pins relative to an automobile body and slideably and rotatably mounting steering knuckles thereon.

It is another object of this invention to provide means for slideably mounting a wheel spindle upon a fixed king pin and shielding the sliding connection from dust and moisture.

It is another object of this invention to provide a novel type of bearing retainer for slideably mounting a wheel spindle upon a fixed king pin.

It is another object of this invention to provide novel means for limiting the travel of a wheel spindle slideably mounted upon a fixed king pin.

It is another object of this invention to provide means for independently springing a pair of road wheels, which means are operable to simplify the process of caster and camber adjustment of the wheels.

It is another object of this invention to provide novel means for mounting a spring between a stearing knuckle and a fixed king pin and protecting said king pin from dust and moisture.

Other objects and advantages of this invention will be apparent from a consideration of the following description and claims and the attached drawings, of which there are two sheets, and in which—

Figure 1 represents a front elevation of an automotive wheel suspension system;

Figure 2 represents an enlarged detailed view of one side of the suspension system shown in Figure 1;

Figure 3 represents a side elevational view of the structure shown in Figure 2 with the wheel removed;

Figure 4 represents a vertical transverse sectional view through one side of the wheel suspension system taken along a plane indicated by the line 4—4 in Figure 3 and looking in the direction of the arrows;

Figure 5 represents a plan view of the spring and king pin portion of the suspension;

Figure 6 represents an elevational view of the bearing retaining cylinder shown in Figure 4;

Figure 7 represents a plan view of the cylinder shown in Figure 6; and

Figure 8 represents an enlarged view of the lower portion of Figure 4.

This invention deals with improvements in the structure and in the means for mounting a wheel suspension of the type more particularly described and claimed in the co-pending application of Nils Erik Wahlberg, Serial No. 312,656, filed January 4, 1940, now Patent #2,304,291 issued Dec. 8, 1942. Generally, the suspension system consists of a pair of generally vertical king pins 10 mounted on the ends of a rigid cross member 12 secured to the underside of the structural portion of the automobile and a pair of steering knuckles 14 cushioned upon the king pins by means of spring assemblies generally indicated at 16 and by strut type shock absorbers 18. The cross member 12 is rigidly secured to the underside of the side frame members 20 of the automobile while the upper ends of the king pins 10 are braced with respect to the body of the automobile by means of forward braces 22 extending to the front cross member 24 of the body and rear brace rods 26 which extend between the tops of the king pins and a diagonal strut member 28 which also forms a part of the automobile body. The tops of the king pins 10 are further interbraced and connected by a tie bar 30. The steering knuckles 14 which support the road wheels 32 are free to rotate about the axis of the king pins 10 and to slide vertically on the king pins against the yielding force of the spring unit 16 and the shock absorbers 18.

More specifically and referring to Figures 2, 3 and 4, the cross member 12 is formed of a generally channel shaped member having its sides extending downwardly and flanged outwardly as at 34. The ends of the cross member are bent downwardly as at 36 and terminate in a portion of relatively shallow cross section at 38. The open face of the channel shaped cross member is closed by a plate 40 which forms the cross member into a generally hollow box section. The side rail member 20 of the automobile frame is provided with a kickup 42 or raised forward end portion from the front of which the front cross member 24 extends to the opposite side rail.

Just over the kickup 42 a sloping strut 28 is attached to the top of the side rail 20 and extends upwardly and backwardly to the dash panel (not shown) of the automobile. The cross member 12 is secured to the underside of the side rail 20 just underneath the lower end of the strut 28 by means of brackets 43 which are welded to the underside of the side rail. Secured along the outer side of the side rail 20 as by welding thereto is an outwardly curving wheel house panel 46 which extends upwardly along the side of the strut 28 and then curves sharply outwardly over the wheel 32. The panel 46 is apertured as at 48 to pass the tie rod 30 and as at 50 to pass the forward brace 22. The rear brace 26 extends through a third aperture 52 in the panel 46. Rubber gaskets 54 are provided to seal the space between the braces and the apertures 50 and 52. The gaskets are generally cone shaped, the apex of the cone 53 being apertured so as to tightly engage the brace rods and the base being provided with flared flanges 55 which engage the panel. As the gaskets are pressed against the panel 46, the flanges 55 spread out causing the apertured apex 53 to grip the brace rods tightly. An externally grooved rubber plate 57 closes the aperture 48, the walls of the aperture 48 being engaged in the grooves.

The forward brace rod 22 is provided with a lower threaded end which is passed through a bracket 56 welded or otherwise suitably secured to the top surface of the front cross member 24. The bracket 56 is formed of two sheets of material bent to have lower surfaces mating with the surface of the cross member 24 and raised flanges extending perpendicular to the rod 22, which flanges are welded together and apertured to receive the end of the brace rod. A nut and lock washer are threaded on the end of the brace rod at each side of the bracket as at 58.

The rear brace rod 26 extends to a bracket 60 secured to the diagonal strut 28 at a point which is to the rear of the king pin 10, inwardly thereof and slightly below the upper end thereof. The bracket 60 is formed of two strips of metal welded to adjacent faces of the strut 28 and bent outwardly perpendicular to the rod 26 to form ears which are welded together and apertured to receive the end of the brace rod. Nuts and lock washers 62 are provided on the end of the brace rod on each side of the bracket 60.

The tie rod 30 is formed of tubular stock and has its ends pressed flat and pierced so as to fit over the end of a stud bolt 31 which is secured to the king pin 10 in a manner which will be more particularly described later. The end of the tie bar is reinforced by a short sleeve 64 (see Figure 4) which is positioned in the end of the tie bar before it is pressed. The upper ends of the brace rods 22 and 26 have eyes 66 formed thereon which also fit around the bolt 31. Just adjacent to the end of the tie rod 30 a U-shaped clip 68 is welded to the underside of the tie rod. The clip 68 is apertured as at 70 to receive the bayonet end 72 of the shock absorber 18. The rubber biscuits 74 and nut 76 yieldingly secure the shock absorber to the clip 68 and the tie rod 30.

Considering the construction of the spring assembly 16 in detail, attention is called to Figure 4 in which the king pin 10 is shown to have its ends drilled and tapped to receive the stud bolt 31 which forms the upper end of the king pin and receives the ends of the brace rods 22 and 26 and the tie rod 30 as was explained above and the cap screw 80 which secures the lower end of the king pin to the cross member 12. The cap screw 80 in the lower end of the king pin 10 is passed through an upwardly flanged opening in a cup shaped member 82 which has rubber or other vibration dampening material 84 bonded to the inside surface thereof. A metal sleeve 88 and a second cup shaped member 86 are positioned inside of the rubber material 84 and may be bonded thereto. The flange of the outer cup shaped member 82 projects into an aperture in the upper surface of the cross member 12 and locates the position of the cap screw 80 and the lower end of the king pin with respect to the cross member. The lower end of the king pin 10 rests directly on a dished washer 90 and a flat rubber washer 92 which seats upon the cross member 12 and the ends of the cup shaped member 82 and sleeve 88; thus it will be seen that the angle of the king pin 10 with respect to the cross member 12 may be changed slightly by causing the cap screw 80 to deform the rubber material 84 within the cup shaped member 82.

Positioned around the king pin 10 is a sleeve 94 which has a smooth inner cylindrical surface of greater diameter than the diameter of the king pin 10. The sleeve 94 is spaced from the king pin and is centered with respect thereto by a series of roller bearings 96 which have their center portion turned on a radius to fit the surface of the king pin and their ends turned on a radius to fit the inner surface of the sleeve 94. These bearings are more particularly described and claimed in the before-mentioned application of Nils Erik Wahlberg, Serial No 312,656, filed January 4, 1940, now Patent #2,304,291 issued Dec. 8, 1942. The bearings 96 are retained in spaced relationship at the ends of a retaining cylinder 98 which has its ends stamped into the shape of a pentagon. The faces of the pentagon are apertured as at 100 (see Figures 6 and 7) to receive the bearings 96 and retain them in place.

The outer surface of the sleeve 94 toward the upper end thereof is provided with a series of annular grooves 102 which mate with internal grooves in a split ring 104. The outer surface of the split ring 104 tapers upwardly and is arranged to engage the inner surface of a conical flange 106 formed on a spring seat 108. The flange presses the split ring 104 against the outside of the sleeve 94 and the grooves 102 prevent the split ring and spring seat 108 from moving downwardly with respect to the sleeve. The extra grooves 102 permit adjustment of the seat with respect to the sleeve 94 to accommodate springs of different length. The coil spring 110 rests upon the spring seat 108 and extends upwardly to an upper spring seat 112. A ball bearing assembly 114 is positioned between the upper surface of the upper spring seat 112 and a hexagonal head 78 formed in the middle of the stud bolt 31 By turning the hexagonal head 78, the lower end of the stud bolt 31 may be threaded into the king pin to hold the spring seat 112 and the bearing assembly in place. The eyes 66 are backed up by the end of the tie bar 30 and a nut 116. Fabric or other non-metallic washers 118 are positioned around the stud bolt 31 on each side of the tie bar 30 and a downwardly opening cup shaped shield 120 is positioned over the bearing assembly 114. The bearing assembly is further received in an inner cup member 122 which has a flange 124 extending into the aperture in the upper spring seat 112. Felt or other sealing material 126 is positioned between the outer cup shaped member 120 and the inner cup 122 to prevent dust from entering around the bearing assembly 114.

An annular ring 127 of fabric, rubber or other non-metallic material is positioned between the top of the spring 110 and the upper spring seat to insulate the spring from the seat. At the bottom of the spring 110 a rubber grommet 128 is positioned on the lower spring seat 108 to insulate the spring from the seat. The grommet 128 has an upwardly extending neck 129 which grips the outside of the sleeve 94 to prevent dust which may leak by the split ring 104 from reaching the spring.

A steering knuckle 14 is formed as a forging and is provided with a downwardly tapering bore arranged to wedge against the downwardly tapering surface of the lower end of the sleeve 94. The steering knuckle is apertured as at 126 to receive a steering knuckle arm for turning the knuckle and sleeve about the king pin and is also provided with a flange 130 to which a backing plate (not shown) for the wheel may be bolted. The spindle 131 is formed upon the steering knuckle forging outwardly of the flange 130. On the inner side of the knuckle 14 there is formed an ear 132 provided with a horizontal bore which is tapped to receive the stud bolt 134. The stud 134 extends generally horizontal from the side of the steering knuckle and is passed through an eye 136 on the lower end of the shock absorber 18. Rubber biscuits 138 are compressed between the washers 140 by the nut 142 to expand the edges of the biscuits into contact with the eye 136 for yieldingly securing the lower end of the shock absorber on the stud 134; thus as the steering knuckle rotates about the axis of the king pin 10 to steer the vehicle, the shock absorber 18 may change its relative alignment with respect to the stud 134 by deforming the rubber biscuits 138. A hexagonal head 144 is formed centrally of the stud 134 and secures a plate 146 against the ear 132 of the steering knuckle. The plate 146 has an upper horizontal portion provided with a semi-circular cutout to abut against the side of the sleeve 94 and a lower horizontal portion which is arranged to engage the dome shaped rubber bumper 148 mounted on the top of the cross member 12 at the lower limit of movement of the sleeve 94 on the king pin. The plate 146 and bumper 148 thus function as a rebound bumper or limit stop for the suspension.

The bearing retaining cylinder 98 and the bearings 96 are retained within the sleeve 94 by coil springs 150 which abut at their outer ends against the flanged plugs 152 press fitted in the ends of the sleeve 94. It will be noted that the lower spring 150 abuts against an annular ring 153 welded to the lower plug 152. The inner ends of the springs 150 abut against the annular metal washers 154 which are riveted or otherwise suitably secured to the faces of the deformable sealing washers 156 of felt or other suitable material. The sealing washers 156 slide between the surfaces of the sleeve 94 and king pin 10 and act to retain lubricant packed around the bearings 96. The washers 156 also act as a secondary seal to prevent dust from coming into contact with the bearings or the surfaces on which they operate. The sealing washers 156 in turn engage the ends of the bearing retainer 98. Snap rings 158 are provided in each end of the cylinder 94 to hold the bearing retaining cylinder 98 in the sleeve 94 should the plugs 152 or springs 158 become displaced.

The flange of the lower plug 152 is fitted within a groove in the upper end of a corrugated bellows 160 and seals the upper end of the bellows to the sleeve 94. The lower end of the bellows 160 is clamped between the edge of the dished washer 90 and the upper surface of the cross member 12; thus there is no passage for dust around the king pin to the lower end of the sleeve 94. Attention is called to the fact that the horizontal portions of the bellows 160 are formed of thicker material than are the nodes 161 of the bellows so that when the sleeve and steering knuckle are lowered with respect to the cross member 12, the horizontal walls 163 of the bellows will form a bumper to cooperate with the bumper 148 in limiting the downward movement of the steering knuckle. The dished washer 92 is apertured at 165 to allow water which may condense in the bellows to escape. The aperture 165 also acts as a vent for air expelled from the bellows when the sleeve 94 is lowered towards the cross member 12. The rubber washer 92 acts as a one way flapper valve to prevent dust from being sucked into the bellows.

The upper end of the sleeve 94 and the spring 110 are sealed from dust by means of a corrugated rubber bellows 162 which is retained in place at its upper end by a split ring 164 clamped around a flange 166 formed on the upper spring seat 112. An annular ring having a downwardly extending flange 168 is welded to the bottom of the lower spring seat 108 and forms a backing against which the lower end of the bellows 162 may be clamped by a second split ring 170. The split rings are provided with ears 172 (see Figure 5) through which are passed the bolts 174 by means of which the ends of the split ring may be drawn together to clamp the rubber sleeve in place. The outer ends 173 of the ears 172 abut against each other so that the bolt 174 will draw the ends of the split ring together rather than bending the outer portions of the ears.

Since the rubber sleeve 162 extending between the fixed upper spring seat and the movable lower spring seat will act as a bellows, the upper spring seat 112 is pierced and provided with a short tube 176 which communicates between the space inside of the bellows 162 and a flexible tube 178 which extends upwardly to a pipe 179 secured by a rubber grommet 175 in the upper portion of the wheel house panel 46. A cap 180 filled with filtering material 182 is positioned over the upper end of the pipe 179. The end of the pipe and the filtering material 182 are positioned in the motor compartment out of the direct path of dust thrown up by the wheel 32 and will prevent dust from entering the bellows 162.

An annular rubber ring 186 is positioned around the upper end of the king pin 10 and is seated against the underside of the upper spring seat 112. It will be noted that the walls of the ring 186 taper in thickness toward each end of the ring and that the ring is positioned directly above the flanged plug 152 on the top of the sleeve 94; thus, near the limit of upward movement of the sleeve 94, with respect to the king pin, the plug 152 will engage the rubber ring 186 and in deforming the ring against the upper spring seat 112 will cushion the sleeve and steering knuckle as they approach their upward limit of movement. The tapered cross section of the ring allows the rubber to flow inwardly towards the king pin until the ring attains a constant cross section. Thus the resistance offered by the ring to movement of the sleeve will increase progressively with movement of the sleeve.

Attention is called to the fact that the caster and camber adjustment of the king pins may be altered by changing the position of the nuts and lock washers 58 and 62 on the brace rods 22 and 26 and that the position of one king pin will follow the position of the other king pin due to the tie rod 30 so that one wheel may be measured for camber and clamped in place and the other wheel will automatically assume its proper position without further measurement. The spring assembly 16 and the roller bearings 96 between the sleeve and the king pin are sealed against dirt. The lower end of the king pin is yieldingly mounted on rubber on the cross member to absorb vibrations in the king pin and so that it may be moved to alter caster and camber. Means have been provided for cushioning the movement of the wheel at its upper and lower limits. It will be noted that the main purpose of the boot 162 is to seal the upper end of the sleeve 94 with respect to the king pin 10 and that the spring 110 may be positioned outside of the boot without departing from the spirit of the invention.

While we have described our invention in some detail, we intend this description to be an example only and not as a limitation of our invention, to which we make the following claims:

1. In combination with an automobile having main frame members, a wheel suspension mechanism comprising a generally rectangular framework having generally vertical side members and a removable top member, braces extending from the top of said framework to said main frame members, means securing the bottom of said framework to the under side of said main frame members, and steering knuckles slideably and rotatably mounted on said vertical side members.

2. In combination with an automobile having main frame members, a wheel suspension mechanism comprising a generally rectangular framework having generally vertical side members, braces extending forwardly and backwardly from the top of said framework to said main frame members, means securing the bottom of said framework to the under side of said main frame members, and steering knuckles slideably rotatably mounted on said vertical side members.

3. In combination with an automobile having a rigid cross member, a pair of king pins mounted in generally vertical position on the ends of said cross member, brace rods extending from the upper ends of said king pins to said automobile, a threaded connection on the ends of each of said brace rods whereby the position of said brace rods with respect to said automobile may be adjusted, a tie bar extending between the upper ends of said king pins, a sleeve slideably and rotatably mounted around each of said king pins, a steering knuckle supported upon each of said sleeves, and a strut type shock absorber extending between each of said steering knuckles and said tie bar.

4. In combination with an automobile having a rigid cross member, a pair of king pins mounted in generally vertical position on the ends of said cross member, brace rods extending from the upper ends of said king pins to said automobile, a threaded connection on the ends of each of said brace rods whereby the position of said brace rods with respect to said automobile may be adjusted, a tie bar extending between the upper ends of said king pins, a sleeve slideably and rotatably mounted around each of said king pins, a steering knuckle supported upon each of said sleeves telescoping said king pin, bearings between said king pins and said sleeves, and a strut type shock absorber extending between each of said steering knuckles and said tie bar, said shock absorbers having yielding connections with said steering knuckles and said tie bar.

5. In combination with an automobile having a generally vertical king pin mounted thereon, a sleeve telescoping said king pin, a retaining cylinder positioned between said sleeve and said king pin, the ends of said retaining cylinder being shaped into plane surfaces along cords of said cylinder and defining rectangular apertures, and roller bearings positioned in said apertures, said roller bearings having their center portions turned on a radius equal to the radius of said king pin and their end portions turned on a radius equal to the radius of the inside of said sleeve.

6. In combination with an automobile having a generally vertical king pin mounted thereon, a sleeve positioned around said king pin, a bearing retaining cylinder positioned between said sleeve and said kng pin, roller bearings retained in said cylinder between said sleeve and said king pin, flanged plugs positioned in each end of said sleeve and spaced around said king pin, and a pair of coil springs, each of said springs having an end abutting against said bearing retaining cylinder and an end abutting against one of said plugs.

7. In combination with an automobile having a generally vertical king pin mounted thereon, a sleeve positioned around said king pin and having wheel supporting mechanism secured thereto, bearings positioned between said king pin and said sleeve, a plug positioned in one end of said sleeve, a second plug positioned in the other end of said sleeve, a flexible bellows secured between said second plug and the end of said sleeve and extending to the end of said king pin, and coil springs positioned within said sleeve and around said king pin at each end of said bearings, said springs abutting against said plugs and said bearings to retain said bearings within said sleeve.

8. In combination with an automobile having a generally vertical king pin mounted thereon, a sleeve positioned around said king pin, a steering knuckle supported by said sleeve, a lower spring seat supported by said sleeve intermediate the ends thereof, an upper spring seat positioned around the upper end of said king pin and having a dust-tight connection therewith, a coil spring extending between said spring seats and partially telescoping said sleeve, a corrugated cylindrical bellows having its ends fixed to said spring seats and telescoping the upper portions of said king pin and sleeve, and means defining a vent from within said bellows.

9. In combination with an automobile having a generally vertical king pin mounted thereon, a sleeve positioned around said king pin, a steering knuckle supported by said sleeve, a lower spring seat supported by said sleeve and located intermediate the ends thereof, an upper spring seat positioned around the upper end of said king pin and having a dust-tight connection therewith, a coil spring extending between said spring seats and partially telescoping said sleeve, a corrugated cylindrical bellows having its ends fixed to said spring seats and telescoping the upper portions of said king pin and sleeve, means defining a vent from within said bellows, and a filter cap positioned on the end of said vent.

10. In combination with an automobile having a generally vertical king pin mounted thereon, a sleeve positioned around said king pin, a steering knuckle supported by said sleeve, a lower spring seat supported by said sleeve, an upper spring seat positioned around the upper end of said king pin, a coil spring extending between said spring seats, a corrugated cylindrical bellows having its ends fixed to said spring seats, means defining a vent from within said bellows, a filter cap positioned on the end of said vent, and an annular ring of deformable material positioned around said king pin between said upper spring seat and the end of said sleeve, said ring having a tapered cross section.

11. In combination with an automobile having a generally vertical king pin mounted thereon, a sleeve positioned around said king pin and arranged to slide longitudinally of and rotate about said king pin, a steering knuckle supported upon said sleeve, a bumper plate secured to said sleeve, a deformable bumper secured to said automobile and arranged to engage said bumper plate at the lower limit of movement of said sleeve on said king pin, and a bellows sealed to the lower end of said sleeve and extending to a fixed portion of said automobile, said bellows having corrugated walls shaped to form a bumper between said sleeve and said automobile.

12. In combination with an automobile having a rigid member extending to the sides thereof, generally vertical king pins supported on the ends of said rigid member, wheel supporting mechanism slideably mounted on said king pins, and corrugated bellows sealed between said wheel supporting mechanisms and the ends of said king pins, the walls of said bellows between the nodes thereof having a tapered cross section arranged to form a bumper between said rigid member and said wheel supporting mechanism.

13. In combination with a generally vertical king pin having a sleeve slideably positioned therearound, a lower spring seat supported by said sleeve, a coil spring positioned upon said spring seat, an upper spring seat defining an aperture in the middle thereof positioned on top of said coil spring, means for clamping said upper spring seat to the end of said king pin and extending through said aperture, and a thrust bearing positioned between said means and said spring seat, said thrust bearing having packing material carried therearound and arranged to prevent the passage of dust through said aperture.

14. In combination with an automobile having a generally vertical king pin mounted thereon, a sleeve positioned around said king pin and having wheel supporting mechanism secured thereto, bearings positioned between said king pin and said sleeve, sealing rings positioned between said king pin and said sleeve at each end of said bearings, a plug positioned in each end of said sleeve and around said king pin, and coil springs positioned between said plugs and sealing rings.

15. In combination with an automobile having a generally vertical king pin mounted thereon, a wheel house panel mounted on said automobile to one side of said king pin, a sleeve positioned around said king pin, a steering knuckle supported by said sleeve, a lower spring seat supported by said sleeve, an upper spring seat positioned around the upper end of said king pin, a coil spring extending between said spring seats, a corrugated cylindrical bellows having its ends fixed to said spring seats, means defining a vent from within said bellows to the space on the opposite side of said wheel house panel from said king pin, and a cap of filtering material positioned on the end of said vent.

16. In combination with an automobile having a generally vertical king pin mounted thereon, a sleeve telescoping said king pin, bearings positioned between said sleeve and said king pin, seals positioned between said sleeve and said king pin on each end of said bearings and slidable relative to said king pin and said sleeve, and flexible seals secured between each end of said sleeve and the ends of said king pin.

17. In combination with an automobile having a generally vertical king pin mounted thereon, a sleeve telescoping said king pin, bearings positioned between said sleeve and said king pin, seals positioned between said sleeve and said king pin on each end of said bearings and slidable relative to said sleeve and said king pin, flexible seals secured between each end of said sleeve and the ends of said king pin, and means forming vents in each of said last mentioned seals.

18. In combination with an automobile having a rigid member extending to the side thereof, a downwardly opening cup shaped member, flexible material positioned within said cup shaped member, a second cup shaped member positioned within said flexible material, a cap screw extending upwardly through said cup shaped members and said rigid member, a generally vertical king pin mounted upon the end of said cap screw and being supported by the end of said rigid member, a corrugated flexible bellows positioned around the lower end of said king pin, means positioned between the bottom of said bellows and the surface of said rigid member forming a one way valve opening from the interior of said bellows, a sleeve telescoping said king pin and being sealed to the upper end of said bellows, the walls of said corrugated bellows between the nodes thereof having a cross section of tapered thickness, wheel supporting means carried by said sleeve, and means defining a one way valve for removing water from said bellows.

19. In combination with an automobile, a pair of generally vertical king pins, vibration damping elements interposed between said automobile and said king pins, means securing said king pins to said automobile through said vibration damping means, means bracing the tops of said king pins with respect to said automobile, means interconnecting the tops of said king pins, wheel supporting mechanism including steering knuckles slideably and rotatably mounted upon said king pins, and coil springs telescoping said king pins and yieldably supporting said automobile upon said wheel supporting means.

20. In combination with an automobile having a rigid cross member, a generally vertical king pin mounted upon the end of said cross member, a dished washer positioned between the end of said king pin and said cross member and defining a vent hole, a rubber washer positioned between said dished washer and said cross member and forming a one way valve over said vent, a sleeve positioned around said king pin, and a flexible bellows telescoping said king pin and sealed to the lower end of said sleeve and to said dished washer.

21. In an automobile having a generally vertical king pin mounted thereon, a sleeve slideably mounted upon said king pin, a spring seat surrounding said sleeve, means for supporting said spring seat upon said sleeve in a plurality of positions, a second spring seat carried at the upper end of said king pin, a flexible bellows extending between said spring seats, a coil spring positioned between said spring seats and within said bellows, a second flexible bellows extending between the lower end of said sleeve and the lower end of said king pin, means defining a two way vent from within said first bellows to the atmosphere surrounding said bellows, a filter on said vent, and means defining a one way vent from the second of said bellows and permitting the escape of air therefrom by preventing the entrance of air thereinto.

NILS ERIK WAHLBERG.
ROSS H. PHELPS.
WALLACE S. BERRY.